United States Patent Office 3,067,977
Patented Dec. 11, 1962

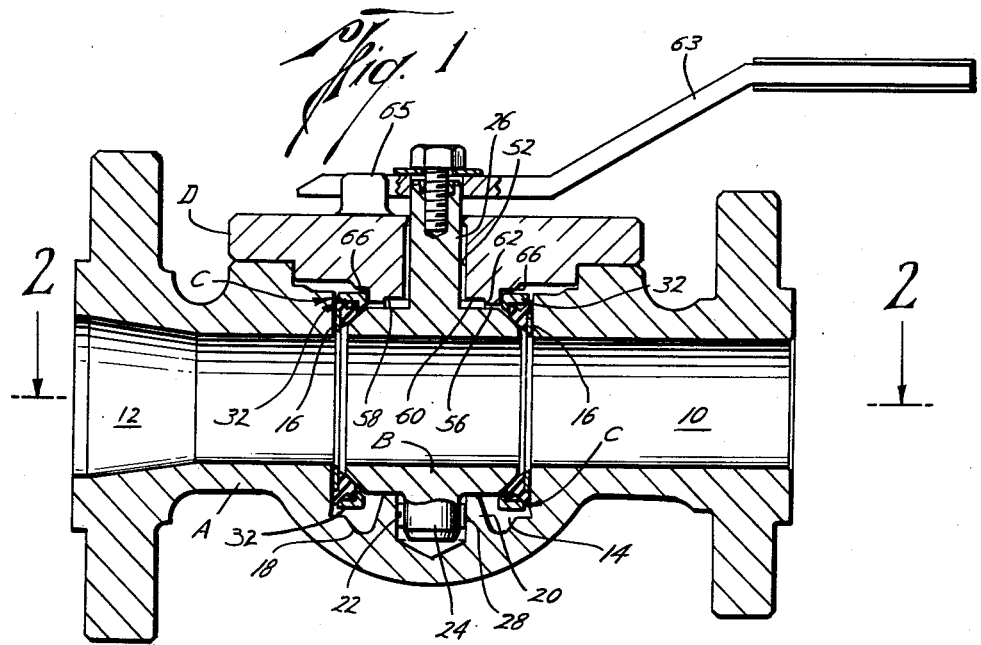
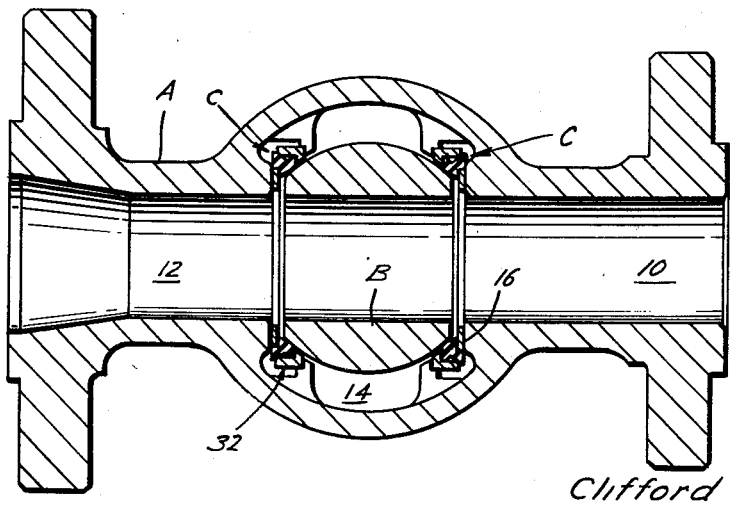
Clifford E. Anderson
Ronald A. Gulick
Dave D. Nagel
INVENTORS

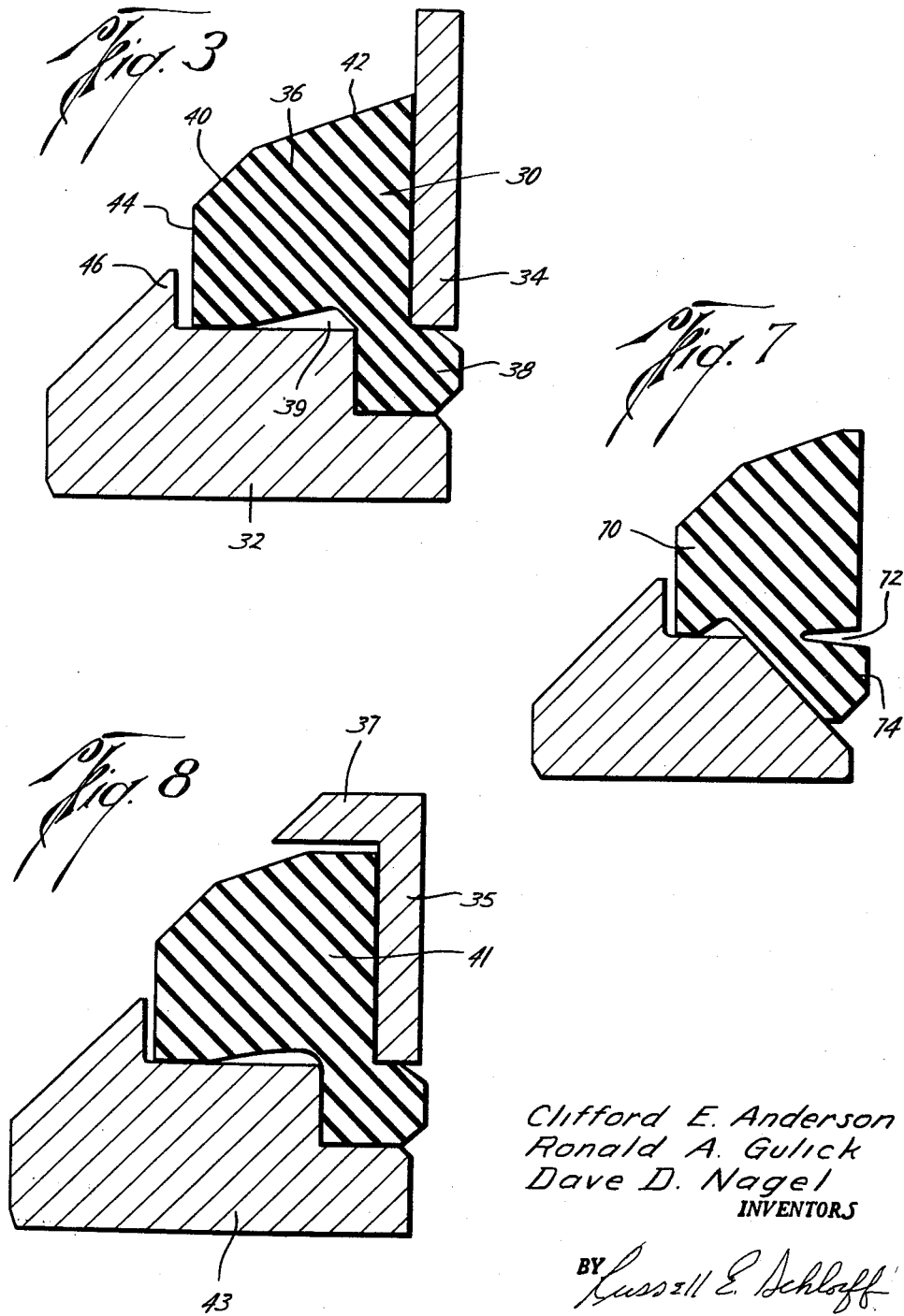

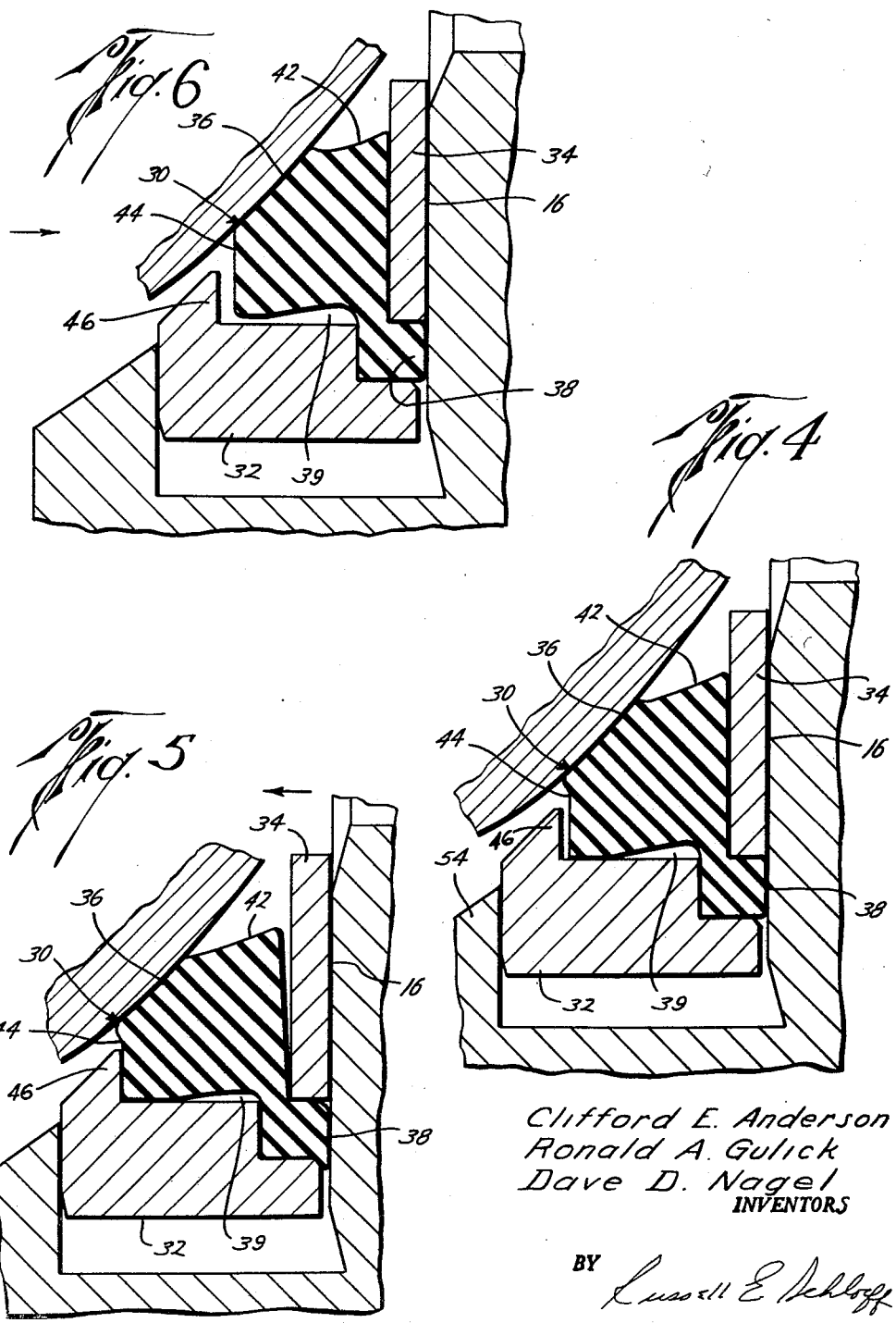

3,067,977
BALL VALVE
Clifford E. Anderson, Ronald A. Gulick, and Dave D. Nagel, Houston, Tex., assignors to ACF Industries, Incorporated, New York, N.Y., a corporation of New Jersey
Filed July 25, 1960, Ser. No. 44,924
14 Claims. (Cl. 251—172)

This invention relates to spherical plug valves, commonly referred to in the industry as ball valves, and more particularly to a top entry ball valve having a non-floating valve member and a sealing element with a resilient seat member which seals by pressure actuation both upstream and downstream over the full pressure range of the valve.

Ball valves themselves are quite old in the art and are rather simple in construction being comprised of a valve body having a central valve chamber, a spherical valve member positioned in the valve chamber, and one or two seat members between the valve member and end of the valve chamber. The valve member has a passage therethrough which in the open position of the valve registers with the inlet and outlet ports, and a stem which projects through the body and provides means to rotate the ball 90° between open and closed positions. Seats for ball valves have been generally formed of various rubber-like materials. However, in certain cases, various plastics have also been used as seat material. Various of the valves having rubber type seats have been of the top entry type, that is, there is an open top valve chamber and the ball and seats are inserted through this opening which is later closed by a bonnet. The top entry construction is beneficial in that it permits a renewing of the seats and valve member while the valve remains in the line. Moreover, the top entry type lends itself to a unitary body structure which can carry line strains much more efficiently than valves in which there are joints along the flow line which are required to transmit line strain. Since plastics generally are rather hard, most of the valves employing seats formed of plastic are not of the top entry type, instead the seats are inserted through one end which is then closed by a closure member forming an end of the valve. In this type of construction, the valve has to be removed from the line in order to replace the valve member or seats and the joint between the body and closure member is required to transmit line strains.

Most of the seals established in ball valves have been of the deformation or interference type, that is, the seats are deformed between the valve member and body to build up an internal force in the seat which causes the seat to maintain intimate contact with the spherical surface of the valve member and the body thereby establishing the seal. The deformation provides not only the initial seal, but also the seal used for normal function of the valve. Therefore, should there be wear of the seat sufficient to decrease the initially built-in interference, the valve will leak. In order to overcome this disadvantage to a certain extent, many of the ball valves have a valve member which is free floating, that is, pressure will force the valve member against the downstream seat. In such case, there will be no upstream seal and the valve will not be suitable for block and bleed service or other services where an upstream seal is desirable. Also, both rubber and plastics have limitations as to internal strength and accordingly valves using such materials have been generally limited to a low pressure range; for example, in a 2″ size to 300# and lower. One reason for this is that with a free floating ball the bearing load on the downstream seal increases as the line pressure increases and the various resilient materials used do not have sufficient internal strength to withstand the higher loads developed by increased line pressure. Another reason is that as the ball rotates between positions, an unsupported portion of the seat is exposed to line pressure which tends to force the unsupported portion of the seat into the run of the valve where it can be cut by the trailing edge of the passage.

The ball valve of the present invention has been designed to overcome the above-mentioned shortcomings. It is of the top entry type having a unitary body provided with an open top chamber interposed between opposed inlet and outlet ports. The spherical plug valve member has two stems; one which is trunnioned in the bottom wall of the valve chamber and the other, which is the operating stem, trunnioned in an aperture in a bonnet which closes the valve chamber. By such construction the valve member is non-floating, in other words restrained from moving downstream, and therefore the high bearing load on the sealing surface of the downstream seat which results if the valve member is free to float is eliminated. Interposed between the valve member and the end walls of the chamber are sealing elements. Since the sealing element is so designed that it is pressure acting both upstream and downstream, the valve will operate with just one sealing element. Each sealing element is comprised of a seat member formed of resilient material, an annular retainer ring which affords circumferential support for the seat member and in higher pressure valves a restraining washer affording internal support. Each seat member has a face mass which forms a seal with the spherical surface of the valve member and a rear mass radially and axially spaced from the face mass which seals against the end wall of the chamber. Although the seat members are under slight deformation due to the initial assembly of the valve, they are so constructed that they will be pressure acting both upstream and downstream over the entire pressure range of the valve. The geometry of the seat member is such that it is similar in function to two O-rings joined by a membrane. This construction permits the front mass of the seat member to act as a dynamic seal and move to form a seal with the spherical surface of the valve member, either upstream or downstream, without disengaging the rear mass, which acts as a static seal, from contact with the end wall of the valve chamber. The sealing element, as a unit, is so designed that the movement of the front mass of the seat member along the spherical surface is limited so that the resilient material forming the seat member will not be extruded. Also, the sealing element is so designed that the material of the seat member will not be extruded during operation of the valve when a portion of the seat member is unsupported. While the seat member is pressure acting and can freely float once it is in position, the body and bonnet are provided with protuberances which limit axial movement of the retainer ring maintaining the rear mass under deformation.

It is the principal object of the present invention to provide a top entry ball valve having a non-floating valve member and a sealing element with a resilient seat member which provides a pressure actuated seal either upstream or downstream over the entire pressure range of the valve.

It is a general object to provide a ball valve utilizing a pressure acting resilient seat member.

It is an object to provide a top entry ball valve having a trunnioned ball and a resilient seat member in which the geometry of the seat member is such that the seat member is pressure acting and acts in effect as two O-rings joined by a flexible membrane.

It is another object to provide a top entry ball valve having a non-floating valve member and a sealing element with a resilient seat member in which the mass of the seat member sealing with the spherical surface of the valve member can move relative to such surface without disengaging the mass that seals with the end wall of the chamber from contact with such wall.

It is still another object to provide a top entry ball valve having a non-floating valve member and a sealing element with a resilient seat member having two masses, one which acts as a dynamic seal and the other which acts as a static seal.

It is a further object to provide a top entry ball valve with a non-floating valve member and a resilient seat member encased in an annular retainer ring which provides full circumferential support for the seat member.

It is still a further object to provide a top entry ball valve having a non-floating valve member and a sealing element with a resilient seat member in which the movement of the seat member, when such seat member is subject to pressure forces tending to move the seat member axially inward along the face of the ball, is limited.

It is still a further object to provide a top entry ball valve having a non-floating valve member and a sealing element with a resilient seat member which is so designed that the seat member will not extrude during the time that a portion thereof is unsupported while the valve is being operated.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

FIG. 1 is a central vertical section through a valve of the present invention, the valve being shown in the open position.

FIG. 2 is a sectional view of the valve shown in FIG. 1 taken generally along lines 2—2 of FIG. 1.

FIG. 3 is a fragmentary diagrammatic enlarged sectional view of a sealing element prior to assembly.

FIG. 4 is a fragmentary diagrammatic and enlarged sectional view drawn to scale which shows the position of the ball relative to the seat in the assembled condition.

FIG. 5 is an enlarged diagrammatic view showing the sealing element functioning as an upstream seal.

FIG. 6 is an enlarged diagrammatic view showing the sealing element functioning as a downstream seal.

FIG. 7 is a view similar to FIG. 3 of an alternate form of sealing element.

FIG. 8 is a view similar to FIG. 3 of another alternate form of sealing element.

Referring now to FIG. 1, the valve is comprised generally of a valve body A, a spherical valve member B, two sealing elements C—C and a bonnet D.

The valve body A has two axially aligned fluid passages 10 and 12 forming inlet and outlet ports respectively. Interposed between the two passages 10 and 12 is an open top valve chamber 14. The chamber 14 has parallel flat inner walls 16—16 surrounding the passages 10 and 12 and a generally hemispherically shaped bottom wall 18 having a centrally located boss member 20. The boss member 20 has an aperture 22 therein.

The spherical valve member B is positioned in the valve chamber 14. The valve member B has two stems 24 and 26. The stem 24 is trunnioned in the aperture 22 of the boss member 20. If desired, a bushing 28 may be interposed between the stem 24 and the aperture 22 especially on valves designed for higher pressures. The other stem 26 extends out past the top of the open-ended valve chamber 14 and is trunnioned in the bonnet D and functions as the operating stem. By trunnioning the valve member B, it will not float when pressure is applied thereby eliminating the high bearing loads on the downstream sealing element resulting from a floating ball. Also, it permits sealing elements C—C to function as pressure actuated seals both upstream and downstream. As the size of the valve decreases, it may be more preferable to cantilever the valve member B rather than trunnion it both top and bottom. On the other hand for higher pressure ranges, it may be desirable to extend stem 24 completely through the body to eliminate the pressure thrust of the valve member. The spherical valve member B has a passage 28 therethrough which in the open position is aligned with the passages 10 and 12 to form the run of the valve. As is customary in ball valves, the spherical valve member is rotatable 90° between open and closed positions.

The sealing elements C—C are positioned between the valve member B and the flat end walls 16—16 of the valve chamber 14. Each sealing element C is formed of a seat member 30, an annular retainer ring 32 and a flat annular restraining ring 34. The seat member 30 is formed of resilient material. By resilient material it is meant a material having the following qualifications: impervious to inner leakage; flexible enough to conform to the spherical surface of the valve member; sufficiently flexible to move with the pressure for which it is designed so that an upstream and downstream pressure actuated seal can be effected; resistant to fluids likely to be carried by the valve; sufficient internal strength to resist excessive distortion and to resist being blown out during operation; low coefficient of friction to permit easy operation; stable characteristics over a wide temperature range; fair degree of resiliency; easy to handle and simple to use; economically available. While these requirements may at first appear rigorous, it has been found that one of the fluorocarbon plastics, i.e., polytetrafluoroethylene sold by Du Pont under the trademark "Teflon," satisfactorily fulfills the above requirements and provides a usable material for the seat member 30. Depending upon the size, lading to be carried and pressure rating, the seat member 30 may be formed of other materials including other fluorocarbon plastics, nylon, other plastics, hard rubber, etc. Each seat member 30 has a face mass 36 which forms a seal with the spherical surface of the valve member B and a rear mass 38 radially and axially spaced from the face mass 36, which forms a seal against the inner wall 16 of the chamber 14. The unassembled axial length of the sealing assemblies C—C and valve member D is slightly greater than the axial length between the walls 16—16; therefore, on assembly there is an interference induced which slightly deforms the seat members 30—30. If only one sealing element is used, the same deformation will result since the valve member B is centrally located and the unassembled axial length from the center line of the valve member B to the end of the sealing element C is greater than the axial length from the center line of the valve to the end wall 16 of the chamber. The interferencee resulting from assembly will depend upon manufacturing tolerances which must be sufficiently loose to permit economical manufacture yet within bounds so that within such tolerances the valve can be assembled with facility and still produce workable sealing elements over the entire pressure range of the valve. The geometry of each seat 30 is such that it is similar in effect to two O-rings joined by a membrane. This membrane allows the front mass 36 of the seat member to move against the spherical surface of the valve member, either upstream or downstream, affecting a seal without disengaging the rear mass 38 from its sealing contact with the end wall 16 of the valve chamber. The membrane itself being continuous prevents leakage between the two masses. The face mass 36 is deformed between the spherical surface of the valve member B and the restraining ring 34 which is arrested by the end wall 16, see FIG. 4. This is in the nature of a coining or setting operation, however, the function of the face mass 36 does not depend upon such deformation. The rear mass 38 is deformed between the retainer ring 32 and end wall 16, see FIG. 4. This also is a coining or setting operation and the seal for the rear mass is more of a deformation type seal only reinforced by pressure actuation. To facilitate the independent movement of the face mass relative to the rear mass, there is a cavity 39 near the juncture of the face mass and rear mass which in effect forms the membrane connecting the face mass 36 to the rear mass 38. This construction imparts a degree of flexibility to the face mass 36 to permit it to move relative to the rear mass 38 without moving the rear mass 38 away from contact with the end wall 16. Since the rear mass 38 independently seals against the end wall 16 of the valve chamber and the face mass 36 against the spherical surface of the valve member B, the face mass 36 will be pressure acting both upstreaem and downstream over the entire pressure range of the valve. In effect, the face mass acts as a dynamic seal moving in response to pressure while the rear mass acts as a static seal and depends upon the deformation developed during assembly. This pressure actuation of the face mass will be further explained as the function of the various other parts of the sealing element C are further developed. As previously mentioned, the membrane permits the face mass 36 to move on the upstream side along the spherical valve member B without unloading the rear mass 38 to cause it to lose contact with the end wall 16. In effect, it permits the face mass to flex relative to the rear mass.

The face mass 36 initially has a frusto conical surface 40 which is the area contacting the spherical surface of the valve member B at the loci of points generally tangent to a radius extending 45° from the horizontal axial centerline of the valve member B. By having the frusto conical surface 40 tangent to the 45° radius, the surface will be equal on each side regardless of whether valve is open or closed and also permits some minor misalignment without destroying the seal. As previously mentioned, upon assembly this frusto conical surface 40 will tend to change to a spherical-like surface, compare FIGS. 3 and 4. Axially outward of the frusto conical surface 40 the face mass has a surface 42 which tapers away from the frusto conical surface 40. The surface 42 is relieved so as to form an entry surface for the edge of the passage in the valve member B when it moves to the closed position. Axially inward of the frusto conical surface 40 there is a surface 44 which is normal to the run of the valve and provides an entry surface for the passage in the valve member B in moving from closed to open position. In the fully closed and fully open positions, the surface 40 of the face mass 36 is in direct contact with the spherical surface of the valve member and supported thereby; however, during operation, a portion of the face mass 36 is out of contact with the spherical surface of the valve member B as the passage 28 moves around. Therefore, the face mass 36 must be of sufficient strength so that the portion of the face mass 36 which is unsupported during operation of the valve will not be blown downstream or move out of position whereby it could be cut by the trailing edge of the passage 28. Since the unsupported area is supported solely by its own strength, it must be of sufficient mass to provide the necessary rigidity. In order to provide sufficient strength, it has been found that it is desirable to make the axial length of the face mass slightly greater than the radial distance.

The annular retainer ring 32 gives full circumferential support to the seat member 30 and thereby limits radial expansion of the seat member. It also provides a pocket for the seat member 30 facilitating top entry. The annular retainer ring 32 in particular provides circumferential support for the outer face of the rear mass 38 so that as pressure from the upstream port contacts the inner face of the rear mass, the back face of the rear mass is kept in contact with the flat end wall 16 of the chamber. Since the rear mass 38 is retained in contact with the end wall 16, upstream pressure will act on the face mass 36 and a pressure actuated upstream seal results, see FIG. 5. The retainer ring 32 has a lip portion 46 which is spaced from and projects in front of the surface 44 of the face mass to limit the movement of the surface 44 when the seat member 30 is subjected to pressure forces which tend to move the face mass 36 axially inward along the surface of the spherical valve member B. The lip portion 46 is spaced from the surface 44 in order to allow a portion of the face mass 36 to flow along the surface of the ball working between the ball and retainer ring to effect the upstream seal, see FIG. 5. The lip 46 also supports the seat member 30 during the operation of the valve, particularly at higher pressures. It does so by affording support to the portion of the face mass 36 which as previously mentioned is unsupported during operation of the valve. The restraining washer 34 is a flat annular ring which is positioned between the axial outer face of the face mass 36 and the end wall 16. As shown in FIG. 4, the outer peripheral edge of the restraining washer 34 extends past the tapering surface 42 of the face mass 36. The restraining ring 34 affords support to the rear mass 38 when the seal element C is acting as a downstream seal and prevents the rear mass 38 from being extruded. It also affords support to the face mass 36 and prevents it from likewise being extruded when the seal element C is acting as a downstream seal, see FIG. 6. As previously mentioned, having a supported ball valve member B permits both seat elements C—C to be pressure actuated. In effect, as an upstream sealing element, the seat member 30 tends to expand along the spherical surface of the valve member B, the seat member 30 being forced into intimate contact and establishing a seal, see FIG. 5. On the downstream side, the body pressure flows around the outer periphery of the seat member 30 and tends to collapse it against the spherical surface of the valve member B again forcing the seat member 30 into intimate contact with the spherical surface of the valve member B and thereby establishing a seal, see FIG. 6. When acting as an upstream seal, the amount of movement is limited by the lip 46 of the retaining ring 32; and when acting as a downstream seal, the amount of movement is limited by the amount of availablbe clearance between the annular restraining washer 34 and the valve member B. The design of the seal element C has been used successfully in ASA Class 400 and 600 valves. In order to function in the 2000# range, it is desirable to provide circumferential inner support for the axially outer end of the seat and a construction similar to that shown in FIG. 8 can be used, in which case the restraining ring 35 is provided with a lip 37 similar to the lip 46 of the retainer ring 32. The lip 37 of the restraining washer 35 also provides support to the face mass and prevents excessive movement of the tapering surface when the seal element is used as a downstream seat. On the upstream side, the lip 37 acts as a deflecting surface for the upstream flow and directs such flow against the tapering surface of the face mass rather than allowing it to be directed between the axial outer side of the face mass and the restraining washer which could cause the unsupported portion of the face mass during operation of the valve to be pushed out into the path of the passageway of the rotated valve member B. Such condition would be most prevalent during slow operation under high flow conditions. At such time, the large volume of lading swiftly moving between the seat 30 and the spherical wall of the valve member B could cause, if it were not deflected by the lip 37, the unsupported portion— that portion in line with the passageway of the valve member—of the face portion 36 of the seat to be pushed out into the path of the passageway of the valve member where if it were so extended the passageway would tend to shear the extended portion of the seat, since the undeflected flow would tend to flow either behind the restraining washer 35 or between the restraining washer 35 and seat 41. The lip deflects the flow sufficiently so that the flow is directed against the tapering surface of the face mass whereby the tendency of the force is to keep the seat back against the restraining washer 35. In view of this function of the lip, it may be desirable to use the lip on lower pressure valves to prevent the cutting action of the upstream seat under high flow conditions. Also, the seat 41 and retainer ring 43 are heavier to accommodate the greater forces developed in the higher pressure valves.

To limit the axial movement of the retainer ring 32, the body A and bonnet D are provided with a number of protuberances 54 which in effect form a pocket for the retainer ring 32. By so limiting the movement of the retainer ring, the rear mass 38 of the seat member remains deformed and is retained in sealing contact against the end wall 16.

The bonnet D is provided with a bore 52 through which the operating stem 26 extends. To effect a seal between the stem 26 and bore 52, the top of the spherical valve member B may be provided with a flat surface 56 and a fluorocarbon plastic washer 58 assembled over the stem 26 and then deformed between a flat annular surface 60 of the bonnet D and the flat surface 56 of the spherical valve member G. The bonnet is provided with an annular surface 62 surrounding the flat surface 60 which limits radial outward expansion of the washer 58 so that a seal is formed between the stem 26 and bore 52. Other types of neck seals well known in the valve art may be used.

To provide means to operate the valve, a handle 63 is attached to the end of the stem 26. As is well known in the art, stops 65 are provided on the bonnet D to limit rotation of the valve member B between open and closed positions.

Since the axial length of the sealing elements C and the valve member B is slightly greater than the axial length between the end walls 16—16 of the valve chamber, it is necessary to slightly deform the seat member 30 during assembly. Since the ball and seat members are assembled under deformation, there is a certain amount of load required in order to push them into assembled condition. It has been found that it is not desirable to push directly on the valve member B since the load then would all be taken by the bottom portion of the seat member 30 and distortion might result. It was found that it is best to apply even pressure on the valve member B and sealing elements C—C as a unit. In order to accomplish this expediently, the bonnet can be so proportioned that it is provided with surfaces 66—66 which will exert pressure on the top of the retainer rings 32—32 and permit the valve to be assembled without distortion of the seats 30—30. As previously mentioned, an expedient means of forming a neck seal is to place a fluorocarbon plastic washer 58 between the top of the ball and the bonnet and put this washer 58 under pressure; therefore, the surfaces 66—66 have to be so proportioned in relationship to the surface 60 that after assembly there will be the required load placed upon the plastic washer 58 so that it will be properly deformed between the surfaces 66—66.

While in the preferred form shown on the drawings the end walls of the valve chamber are parallel, it is possible to so design the valve to utilize tapering end walls.

FIG. 7 shows a form of seal used in a low pressure valve. In this form of sealing element, the restraining washer 34 is omitted and the seat 70 is provided instead with a kerf 72. The kerf 72 permits pressures to act on the rear mass 74 so that it establishes a seal with an end wall in a manner similar to the seat 30 previously described.

As can be seen from the foregoing, the present invention is primarily directed to a top entry ball valve having sealing elements which are pressure acting both upstream and downstream over the entire pressure range for which the valve is designed. To accomplish this, the valve member B is non-floating and the seal elements C—C float. By utilizing such construction, it has been possible to design a high pressure ball valve utilizing resilient seat members which will effectively seal both upstream and downstream from either direction.

The seat members are so constructed that they have a face mass which can act independently of a rear mass and the face mass acts as a dynamic seal to establish through pressure actuation a seal between the seat and valve member and the rear mass acts as a static seal and through initial deformation always retains a seal between the seat and body so that there will be no leakage behind the seat.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

We claim:
1. A spherical plug valve comprising a valve body having two axially aligned fluid passages forming inlet and outlet ports and an open-top valve chamber interposed between said passages, the walls defining said chamber including end walls surrounding said passages, a rotatable generally spherical valve member positioned in the valve chamber, said valve member having a passage which in the open position of the valve registers with the inlet and outlet ports to form the run of the valve, an operating stem extending through the opening of the chamber, an annular seat member formed of resilient material positioned between the valve member and an end wall of the valve chamber, said seat member having a face mass provided with a valve engaging surface contacting the spherical surface of the valve member, a surface axially outward of said valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, an annular metal retainer ring surrounding said seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, a bonnet having a bore closing the opening of the valve chamber, the operating stem trunnioned in said bore, means attaching the bonnet to the body, means establishing a seal between the body and bonnet, and means to form a seal for said bore.

2. A spherical plug valve comprising a valve body having two axially aligned fluid passages forming inlet and outlet ports and an open-top valve chamber interposed between said passages, the walls defining said chamber including end walls surrounding said passages and a bottom wall, a rotatable generally spherical valve member positioned in the valve chamber, said valve member having a passage which in the open position of the valve registers with the inlet and outlet ports to form the run of the valve and having two stems, one stem supported by the bottom wall and an operating stem extending through the opening of the chamber, an annular seat member formed of resilient material positioned between the valve member and an end wall of the valve chamber, the unassembled condition of said seat being of a slightly greater axial length than the axial length between the valve member and end wall of the valve chamber whereby the seat is slightly deformed by assembly, each seat member having a face mass provided with a valve engaging surface contacting the spherical surface of the valve member, a surface axially outward of said valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, an annular metal retainer ring surrounding said seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, means facilitating flexing between the two masses to permit the face mass to move on the upstream side along the spherical valve member without unloading the rear mass so as to cause it to lose contact with the end wall, a bonnet having a bore closing the opening of the valve chamber, the operating stem trunnioned in said bore, means attaching the bonnet to the body, means establishing a seal between the body and bonnet, and means to form a seal for said bore.

3. The valve specified in claim 2 characterized in that there is a flat annular restraining washer between the face mass and end wall and radially inward of the rear mass to aid in the stabilization of the face mass and rear mass.

4. The valve specified in claim 2 characterized in that the retaining ring is positioned in a pocket formed by protuberances in the body and bonnet.

5. The valve specified in claim 2 characterized in that there are two seat members, one on each side of the valve member.

6. A spherical plug valve comprising a valve body having two axially aligned fluid passage forming inlet and outlet ports and an open-top valve chamber interposed between said passages, the walls defining said chamber including end walls surrounding said passages and a bottom wall having a centrally located boss member, the boss having an aperture therein, a rotatable generally spherical valve member positioned in the valve chamber, said valve member having a passage which in the open position of the valve registers with the inlet and outlet ports to form the run of the valve and having two stems, one stem trunnioned in the aperture of the boss member and an operating stem extending through the opening of the chamber, annular seat members formed of resilient material positioned between the valve member and flat end walls of the valve chamber, the unassembled condition of said seats and valve member being of a slightly greater axial length than the axial length between the two parallel flat end walls of the valve chamber whereby the seats are slightly deformed by assembly, each seat member having a face mass provided with a valve engaging surface contacting the spherical surface of the valve member, a surface axially outward of said valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, an annular metal retainer ring surrounding each seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, means facilitating flexing between the two masses to permit the face mass to move on the upstream side along the spherical valve member without unloading the rear mass so as to cause it to lose contact with the end wall, a flat annular metal restraining washer between the face mass and end wall and radially inward of the rear mass to prevent the rear mass and face mass from being extruded, a bonnet having a bore closing the opening of the valve chamber, the operating stem trunnioned in said bore, means attaching the bonnet to the body, means establishing a seal between the body and bonnet, means to form a seal for said bore and protuberances in the body and bonnet forming pockets which limit axial movement of said retaining rings.

7. A spherical plug valve comprising a valve body having two axially aligned fluid passages forming inlet and outlet ports and an open-top valve chamber interposed between said passages, the walls defining said chamber including flat end walls surrounding said passages and a bottom wall having a centrally located boss member, the boss having an aperture therein, a rotatable generally spherical valve member positioned in the valve chamber, said valve member having a passage which in the open position of the valve registers with the inlet and outlet ports to form the run of the valve and having two stems, one stem trunnioned in the aperture of the boss member and an operating stem extending through the opening of the chamber, annular seat members formed of resilient material positioned between the valve member and flat end walls of the valve chamber, the unassembled condition of said seats and valve member being of a slightly greater axial length than the axial length between the two parallel flat end walls of the valve chamber whereby the seats are slightly deformed by assembly, each seat member having a face mass provided with a valve engaging surface contacting the spherical surface of the valve member, a surface axially outward of the valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, an annular metal retainer ring surrounding each seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, a cavity between the seat and retainer ring near the juncture of the face mass and rear mass to facilitate flexing between the two masses and permit the face mass to move on the upstream side along the spherical valve member without unloading the rear mass so as to cause it to lose contact with the end wall, a flat annular metal restraining washer between the face mass and end wall and radially inward of the rear mass to prevent the rear mass and face mass from being extruded, a bonnet having a bore closing the opening of the valve chamber, the operating stem trunnioned in said bore, means attaching the bonnet to the body, means establishing a seal between the body and bonnet, means to form a seal for said bore, and protuberances in the body and bonnet forming pockets which limit axial movement of said retaining ring.

8. A spherical plug valve comprising a valve body having two axially aligned fluid passages forming inlet and outlet ports and an open-top valve chamber interposed between said passages, the walls defining said chamber including end walls surrounding said passages and a bottom wall, a rotatable generally spherical valve member positioned in the valve chamber, said valve member having a passage which in the open position of the valve registers with the inlet and outlet ports to form the run of the valve and having two stems, one stem supported by the bottom wall and an operating stem extending through the opening of the chamber, an annular seat member formed of resilient material positioned between the valve member and an end wall of the valve chamber, the unassembled condition of said seat being of a slightly greater axial length than the axial length between the valve member and end wall of the valve chamber whereby the seat is slightly deformed by assembly, each seat member having a face mass provided with a valve engaging surface contacting the spherical surface of the valve member, a surface axially outward of the valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, an annular metal retainer ring surrounding each seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, means facilitating flexing between the two masses to permit the face mass to move on the upstream side along the spherical valve member without unloading the rear mass so as to cause it to lose contact with the end wall, a flat annular metal restraining ring between the face mass and end wall and radially inward of the rear mass, said restraining ring having a lip portion to prevent the rear mass and face mass from being extruded, a bonnet having a bore closing the opening of the valve chamber, the operating stem trunnioned in said bore, means attaching the bonnet to the body, means establishing a seal between the body and bonnet, means to form a seal for said bore, and protuberances in the body and bonnet forming a pocket which limits axial movement of said retaining ring.

9. A spherical plug valve comprising a valve body having two axially aligned fluid passages forming inlet and outlet ports and an open-top valve chamber interposed between said passages, the walls defining said chamber including parallel flat end walls surrounding said passages, a rotatable generally spherical valve member positioned in the valve chamber, said valve member having a passage which in the open position of the valve registers with the inlet and outlet ports to form the run of the valve and having two stems, one stem adapted to be supported by the bottom wall and an operating stem extending through the opening of the chamber, annular seat members formed of resilient material positioned between the valve member and flat end walls of the valve chamber, the unassembled condition of said seats and valve member being of a slightly greater axial length than the axial length between the two parallel flat end walls of the valve chamber whereby the seats are slightly deformed by assembly, each seat member having a face mass provided with a valve engaging surface contacting the spherical surface of the valve member, and a rear mass radially and axially removed from the face mass contacting the end wall, an annular metal retainer ring surrounding each seat member to afford it circumferential support, a bonnet having a bore closing the opening of the valve chamber, the operating stem trunnioned in said bore, means attached to the bonnet adapted to contact said rings and the top of said valve member so that pressure exerted on said bonnet to assemble the valve will be distributed to the retainer rings and top of the valve member to prevent undue pressure on the seat rings.

10. A spherical plug valve comprising a valve body having two axially aligned fluid passages forming inlet and outlet ports and an open-top valve chamber interposed between said passages, the walls defining said chamber including end walls surrounding said passages, a rotatable generally spherical valve member positioned in the valve chamber, said valve member having a passage which in the open position of the valve registers with the inlet and outlet ports to form the run of the valve, an operating stem extending through the opening of the chamber, means supporting said valve member to make it non-floating, at least one annular seat member formed of resilient material positioned between the valve member and an end wall of the valve chamber, the unassembled condition of said seat being of a slightly greater axial length than the axial length between the valve member and end wall of the valve chamber whereby the seat is slightly deformed by assembly, each seat member having a face mass provided with valve engaging surface contacting the spherical surface of the valve member, a surface axially outward of the valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, an annular metal retainer ring surrounding said seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, means facilitating flexing between the two masses to permit the face mass to move on the upstream side along the spherical valve member without unloading the rear mass so as to cause it to lose contact with the end wall, means to prevent the rear mass and face mass from being extruded, a bonnet having a bore closing the opening of the valve chamber, the operating stem trunnioned in said bore, means attaching the bonnet to the body, means establishing a seal between the body and bonnet, and means to form a seal for said bore.

11. A spherical plug valve comprising a valve body having two axially aligned fluid passages forming inlet and outlet ports and an open-top valve chamber interposed between said passages, the walls defining said chamber including end walls surrounding said passages, a rotatable generally spherical valve member positioned in the valve chamber, said valve member having a passage which in the open position of the valve registers with the inlet and outlet ports to form the run of the valve, an operating stem extending through the opening of the chamber, an annular seat member formed of resilient material positioned between the valve member and an end wall of the valve chamber, said seat member having a face mass provided with a valve engaging surface contacting the spherical surface of the valve member, a surface axially outward of said valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, an annular metal retainer ring surrounding said seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, a flat retaining washer having a lip surrounding its inner circumference positioned between the seat member and the end wall, said lip on the upstream side deflecting the flow of lading from back of the seat to the face mass, a bonnet having a bore closing the opening of the valve chamber, the operating stem trunnioned in said bore, means attaching the bonnet to the body, means establishing a seal between the body and bonnet, and means to form a seal for said vertical bore.

12. A spherical plug valve comprising a valve body having two axially aligned fluid passages forming inlet and outlet ports and an open-top valve chamber interposed between said passages, the walls defining said chamber including end walls surrounding said passages and a bottom wall, a rotatable generally spherical valve member positioned in the valve chamber, said valve member having a passage which in the open position of the valve registers with the inlet and outlet ports to form the run of the valve and having two stems, one stem supported by the bottom wall and an operating stem extending through the opening of the chamber, an annular seat member formed of resilient material positioned between the valve member and an end wall of the valve chamber, the unassembled condition of said seat being of a slightly greater axial length than the axial length between the valve member and end wall of the valve chamber whereby the seat is slightly compressed by assembly, each seat member having a face mass provided with a valve engaging surface contacting the spherical surface of the valve member, a surface axially outward of said valve engaging surface being relieved so as to be out of contact with the spherical surface of the valve member and thereby form an entry surface for the edge of the passage in the valve member when it moves to the closed position and a surface normal to the run of the valve and a rear mass radially and axially removed from the face mass contacting the end wall, an annular metal retainer ring surrounding said seat member to afford it circumferential support, said retainer ring having a lip portion which is spaced from and projects in front of the face mass to limit the movement of the face mass when said mass is subjected to pressure forces tending to move the face mass axially inward along the surface of the spherical valve member, means facilitating flexing between the two masses to permit the face mass to move on the upstream side along the spherical valve member without unloading the rear mass so as to cause it to lose contact with the end wall, a flat annular restraining washer between the face mass and end wall having a lip portion opposing the face mass around its inner circumference, a bonnet having a bore closing the opening of the valve chamber, the operating stem trunnioned in said bore, means attaching the bonnet to the body, means establishing a seal between the body and bonnet, and means to form a seal for said vertical bore.

13. The valve specified in claim 2 characterized in that there are two seat members, one on each side of the valve member.

14. A spherical plug valve comprising a valve body having two axially aligned fluid passages forming inlet and outlet ports and an open-top valve chamber interposed between said passages, the walls defining said chamber including parallel flat end walls surrounding said passages, a rotatable generally spherical valve member positioned in the valve chamber, said valve member having a passage which in the open position of the valve registers with the inlet and outlet ports to form the run of the valve and having two stems, one stem adapted to be supported by the bottom wall and an operating stem extending through the opening of the chamber, annular seat members formed of elastomer material positioned between the valve member and flat end walls of the valve chamber, each seat member having a face mass provided with a valve engaging surface contacting the spherical surface of the valve member, and a rear mass radially and axially removed from the face mass contacting the end wall, an annular metal retainer ring surrounding each seat member to afford it circumferential support, a flat retaining washer having a lip surrounding its inner circumference opposing the face mass positioned between the seat member and end wall, a bonnet having a bore closing the opening of the valve chamber, the operating stem trunnioned in said bore.

References Cited in the file of this patent

UNITED STATES PATENTS

| 2,373,628 | Gleeson | Apr. 10, 1945 |
| 2,945,666 | Freeman | July 19, 1960 |

FOREIGN PATENTS

| 149,684 | Australia | Jan. 19, 1953 |
| 843,149 | Great Britain | Aug. 4, 1960 |